United States Patent [19]
Osanai

[11] Patent Number: 4,704,683
[45] Date of Patent: Nov. 3, 1987

[54] DEVICE FOR PERFORMING CONTROL DURING ACCELERATION CONTINUOUSLY VARIABLE TRANSMISSION SYSTEM FOR VEHICLE

[75] Inventor: Akinori Osanai, Susono, Japan

[73] Assignee: Toyota Jidosha Kabushiki Kaisha, Toyota, Japan

[21] Appl. No.: 739,272

[22] Filed: May 30, 1985

[30] Foreign Application Priority Data

Jun. 1, 1984 [JP] Japan ............................... 59-110928

[51] Int. Cl.$^4$ ...................... B60K 41/12; F16H 11/00
[52] U.S. Cl. .................................. 364/424.1; 74/865; 74/866; 474/12; 474/28
[58] Field of Search ...................... 364/424.1; 74/866; 474/11, 12, 16, 18, 28

[56] References Cited

U.S. PATENT DOCUMENTS

| 4,507,986 | 4/1985 | Okamura et al. | 74/866 |
| 4,546,673 | 10/1985 | Shigematsu et al. | 74/866 |
| 4,561,327 | 12/1985 | Niwa et al. | 74/866 |
| 4,569,254 | 2/1986 | Itoh et al. | 74/866 |
| 4,584,907 | 4/1986 | Niwa et al. | 74/866 |
| 4,594,916 | 6/1986 | Ito et al. | 74/866 |
| 4,601,680 | 7/1986 | Tokoro et al. | 474/11 |

FOREIGN PATENT DOCUMENTS

| 59-144849 | 8/1984 | Japan | 364/424.1 |
| 59-144850 | 8/1984 | Japan | 364/424.1 |

Primary Examiner—Felix D. Gruber
Attorney, Agent, or Firm—Oblon, Fisher, Spivak, McClelland, & Maier

[57] ABSTRACT

In a device for performing the control during acceleration in a continuously variable transmission system for a vehicle, wherein a speed ratio e of the continuously variable transmission system is controlled such that an actual engine rotational speed Ne can be a target engine rotational speed Ne', a predetermined value Nb lower than Ne' and a predetermined vale N×3 slightly higher than Nb are set, the shift in the continuously variable transmission system is interrupted until Ne is increased to a predetermined value higher than Ne' when Ne enters a state of Nb<Ne≦N×3, and the speed ratio e of the continuously variable transmission system is continuously raised until Ne is decreased to a state of Ne≦N×3 when Ne is changed from a state of Ne>Ne' to a state of Ne<Ne', so that the device can maintain a satisfactory acceleration, suppress the decline of a transmission efficiency and reduce the noise level during acceleration.

11 Claims, 8 Drawing Figures

DEVICE FOR PERFORMING CONTROL DURING ACCELERATION CONTINUOUSLY VARIABLE TRANSMISSION SYSTEM FOR VEHICLE

BACKGROUND OF THE INVENTION

1. Field of the Invention

This invention relates to a control device in a continuously variable transmission system (hereinafter referred to briefly as "CVT") used as a power transmission system in a vehicle, and more particularly to a control device used during acceleration of the vehicle.

2. Description of the Prior Art

In a control device in a CVT, an engine rotational speed, at which a required engine output can be obtained at the minimum fuel consumption rate, is set as a target engine rotational speed Ne', and a speed ratio e (=Nout/Nin, where Nout is a rotational speed on the output side of the CVT, and Nin a rotational speed on the input side of the CVT) is controlled such that an actual engine rotational speed Ne can be a target engine rotational speed Ne'. For example, in Japanese Patent Publication No. 58-184347, (Application No. 67362/1982), a shift speed of the CVT during acceleration is determined on the basis of a difference between Ne' and Ne. Since the difference between Ne' and Ne occurs during acceleration, the shift of the CVT is continuously performed.

However, since, during shift, the transmission efficiency of the CVT is low, the fuel consumption rate is deteriorated accordingly, and further, a target engine rotational speed Ne' is set at a high value, whereby, when the acceleration time period is lengthened at the time of the maximum throttle valve opening, undesirable noise level occurs.

SUMMARY OF THE INVENTION

A first object of the present invention is to provide a device for performing the control during acceleration in a CVT, capable of maintaining a satisfactory acceleration, suppressing the deterioration of a transmission efficiency and controlling the noise level during acceleration.

A second object of the present invention is to provide a device for performing the control during acceleration in a CVT, capable of further stabilizing the acceleration characteristics in addition to the above-mentioned advantages.

A third object of the present invention is to provide a device for performing the control during acceleration in a CVT, capable of making compatible the responsiveness and the convergence of the control of shift ratio during acceleration.

To achieve the aforesaid first object, a first invention of the present invention contemplates that, in a control device in a CVT for a vehicle, wherein a speed ratio e of the CVT is controlled such that an actual engine rotational speed Ne can be a target engine rotational speed Ne', the control device comprises:

processor means for performing the functions of, setting a predetermined value Nb lower than said Ne' and a predetermined value N×3 slightly higher than Nb, generating a signal for controlling interrupting, when Ne enters a state of Nb<Ne≦N×3, changes in the speed ratio of said continuously variable transmission system until Ne is increased to a predetermined value equal to or higher than Ne', and generating signals for controlling continuously raising the speed ratio e of said continuously variable transmission system until Ne is decreased to a state of Ne≦N×3 when Ne is changed from a state of Ne≧Ne' to a state Ne<Ne'; and means for varying said speed ratio e under the control of the signals generated by said processor means.

A specific form of this first invention is of such an arrangement that the aforesaid target engine rotational speed Ne' is set as a function of an intake throttle opening and a vehicle speed, so that the target engine rotational speed Ne' itself can meet the running conditions of the vehicle satisfactorily.

Another specific form of this first invention is of such an arrangement that the aforesaid Nb is set at a value in a predetermined ratio to Ne' in a region of a low throttle opening, so that setting of Nb during low acceleration can be facilitated.

A further specific form of this first invention is of such an arrangement that the aforesaid Nb is set at a value of 90% of Ne' in a region of a low throttle acceleration, so that Nb can be set at a specifically suitable value during low acceleration.

A still further specific form of this first invention is of such an arrangement that the aforesaid Nb is set as the maximum torque engine rotational speed during the maximum throttle opening, so that setting of Nb during high acceleration can be properly achieved.

A still more further specific form of this first invention is of such an arrangement that the aforesaid N×3 is set at a value 50-200 rpm higher than Nb, so that N×3 can be set in a suitable relationship to Nb. Considering delay of response, N×3 is to be set in addition Nb.

A yet further specific form of this first invention is of such an arrangement that, in the case where the aforesaid Ne is changed from a state of Ne≧Ne' to a state of Ne<Ne', a shift speed of the CVT before Ne is decreased to a state of Ne≦N×3 is set separately of the case other than the above, so that the optimal shift speed in consideration of the responsiveness and smoothness of the shift can be achieved at all times.

On the other hand, to achieve the aforesaid second object, a second invention contemplates that, in a device for performing the control during acceleration in a CVT for a vehicle, wherein a speed ratio e of the CVT is controlled such that an actual engine rotational speed Ne can be a target engine rotational speed Ne', the control device comprises:

processor means for performing the functions of, setting a predetermined value Nb lower than said Ne' and a predetermined value N×3 sligtly higher than Nb, detecting whether a difference between Ne' and Nb is large or not;

generating a signal for controlling interrupting, when Ne enters a state of Nb<Ne≦N×3, changes in the speed ratio of said continuously variable transmission system until Ne is increased to a predetermined value equal to or higher than Ne', and generating signals for controlling continuously raising the speed ratio e of said continuously variable transmission system until Ne is decreased to a state of Ne≦N×3 when the difference between Ne' and Nb is large and Ne is changed from a state Ne≧Ne' to a state of Ne<Ne'; and means for varying said speed ratio e under control of the signals generated by said processor means.

A specific form of this first invention is of such an arrangement that a threshold value for determining whether the difference between Ne' and Nb is large or not is set at a value 50-200 rpm lower than Ne', so that a region where the control is performed is determined to the optimum.

Further, to achieve the aforesaid third object, a third invention contemplates that, in a device for performing the control during acceleration in a CVT for a vehicle, wherein a speed ratio e of the CVT is controlled such that an actual engine rotational speed Ne can be a target engine rotational speed Ne', the control device comprises:

processor means for performing the following functions, setting a predetermined value $N \times 1$ higher than said Ne', generating signals for controlling the variation value $\Delta e$ of said speed ratio e to be at a small value when said Ne is in a state of $Ne' < Ne \leq N \times 1$, and generating signals for controlling the variation value $\Delta e$ of said speed ratio e to be at a large value when said Ne is in a state of $Ne > N \times 1$; and means for varying said speed ratio e under control of the signals generated by said processor means.

Furthermore, a specific form of this third invention is of such an arrangement that $N \times 1$ is set at a value 100 rpm higher than Ne', so that a boundary in balance as to whether the higher importance is to be given to the responsiveness or the convergence can be most suitably determined.

According to the present invention, the target engine rotational speed Ne' is increased with the increase of the intake throttle opening during acceleration. Since $Ne \leq Nb$ in the initial stage of the acceleration, the speed ratio of the CVT is lowered and Ne is increased due to the feedback control of Ne. When Ne reaches a state of $Nb < Ne \leq N \times 3$, the shift of the CVT is interrupted and the speed ratio e of the CVT is fixed to a value before the interruption of the shift. As the result, the vehicle speed V is rapidly increased with the increase of Ne. When Ne is increased to a value higher than Ne' with the increase of an engine output due to the increase of the intake throttle opening, the feedback control of Ne is rapidly and highly convergingly performed, whereby Ne is changed from a state of $Ne > Ne'$ to a state of $Ne < Ne'$. As described above, subsequently, the speed ratio e of the CVT is rapidly raised until Ne is decreased to a state of $Ne \leq N \times 3$, and Ne reaches the state of $Nb < Ne \leq N \times 3$ again. In consequence, during acceleration, the speed ratio e of the CVT is raised to a steady value, repeating the interruptions and raisings.

As described above, according to the present invention, during acceleration of the vehicle, periods of time, during which the speed ratio e of the CVT is fixed, and periods of time, during which the speed ratio e is rapidly raised, are alternately repeated, so that vehicle can be smoothly accelerated. Further, during acceleration, periods of time, during which the shift in the CVT is interrupted, is lengthened, so that the fuel consumption rate can be improved. Furthermore, even during acceleration around the maximum throttle opening, the engine rotational speed Ne is not continuously operated around the target engine rotational speed Ne' as being the maximum engine torque rotational speed, the periods of time, during which Ne is suitably separated from the maximum engine torque rotational speed, are frequent, so that the noise level can be lowered. Further, the acceleration does not become unstable, and the feedback control of the engine rotational speed Ne can be satisfactorily performed.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Description will hereunder be given of one embodiment of the present invention with reference to the drawings.

Figure 2:
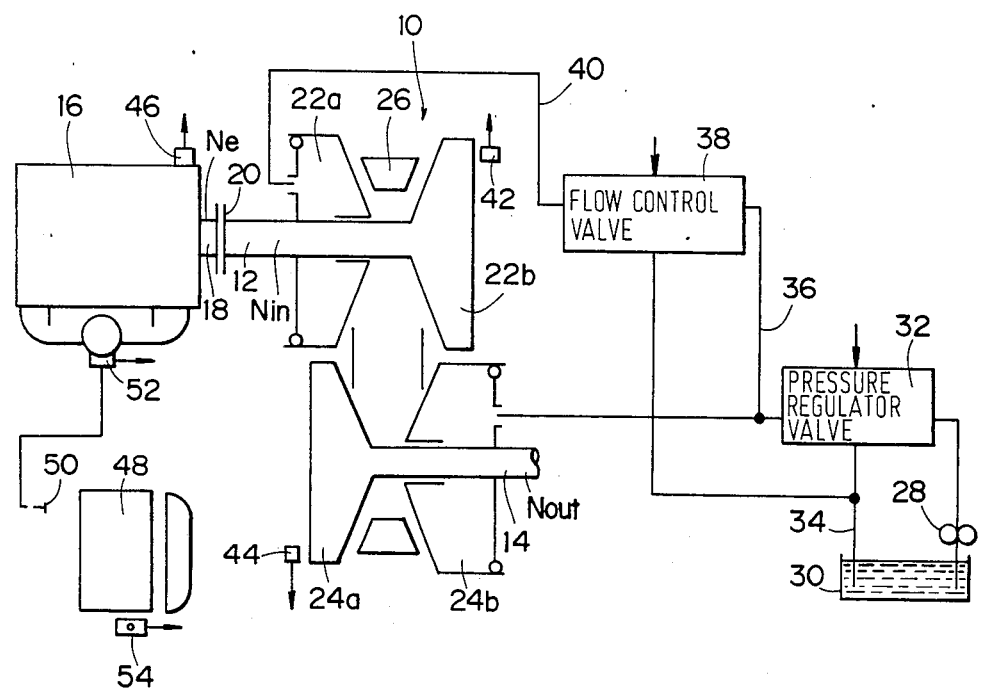
FIG. 2 is a schematic diagram of the CVT as a whole.

Referring to FIG. 2, a CVT 10 has an input shaft 12 and an output shaft 14 being in parallel to each other. The input shaft 12 is provided coaxially with a crankshaft 18 of an engine 16, and connected to the crankshaft 18 through a clutch 20. Pulleys 22a and 22b on the input side are opposed to each other, and one 22a of the pulleys on the input side as being a movable pulley is provided on the input pulley in a manner to be movable in the axial direction, and fixed in the rotating direction, while, the other 22b of the pulleys on the input side as being a stationary pulley is fixed to the input shaft 12. Similarly, pulleys 24a and 24b on the output side are opposed to each other, one 24a of the pulleys on the output side as being a stationary pulley is fixed to the output shaft 14, while, the other 24b of the pulleys on the output side as being a movable pulley is provided on the output shaft 14 in a manner to be movable in the axial direction and fixed in the rotating direction. Opposed faces of the pulleys 22a and 22b on the input side and those of the pulleys 24a and 24b on the output side are formed into tapered shapes, respectively, and a belt 26 being an isosceles trapezoidal shape in cross section is racked across the pulleys 22a and 22b on the input side and the pulleys 24a and 24b on the output side. An oil pump 28 feeds oil to a pressure regulator valve 32 from an oil pool 30. The pressure regulator valve 32 comprises an electromagnetic relief valve and varies a spill volume of oil to a drain 34 to control a line pressure of an oil line 36, whereby the line pressure of an oil line 36 is delivered to a hydraulic cylinder of the pulley 24b on the output side and a flow control valve 38. The flow control valve 38 controls the feed flowrate of oil from the oil line 36 to an oil line 40 connected to a hydraulic cylinder of the pulley 22a on the input side and the discharge flowrate of oil from the oil line 40 to the drain 34. Forces urging against the belt 26 of the pulleys 22a and 22b on the input side and of the pulleys 24a and 24b on the output side are controlled by the hydraulic pressures of the hydraulic cylinders on the input side and the output side, and the diameters of the belt 26 guided around the tapered surfaces of the pulleys 22a and 22b on the input side and of the pulleys 24a and 24b on the output side, which are varied in association with the aforesaid urging forces, with the result that the speed ratio e (=Nout/Nin, where Nout is a rotational speed of the output shaft 14, Nin is a rotational speed of the input shaft 12, and, in this embodiment, Nin=engine rotational speed Ne) of the CVT 10 is varied. The line pressure of the hydraulic cylinder on the output side is controlled to the least necessary value which can secure the power transmission, avoiding slips of the belt 26, and prevent the loss of drive to the oil pump 28, and the speed ratio e is controlled by the hydraulic pressure of the hydraulic cylinder on the input side. Additionally, the hydraulic pressure of the hydraulic cylinder on the input side is lower than or equal to the hydraulic pressure of the hydraulic cylinder on the output side, however, the pressure receiving area of the hydraulic cylinder on the input side is larger than the pressure receiving area of the hydraulic cylinder on the output side, so that the urging force of the pulleys 22a and 22b on the input side can be made larger than the urging force of the pulleys 24a and 24b on the output side. A rotation angle sensor 42 on the input side and a rotation angle sensor 44 on the output side detect rotational speeds Nin and Nout of the input shaft 12 and the output shaft 14, respectively, and a water temperature sensor 46 detects cooling water temperature of the engine 16. An accelerator pedal 50 is provided at a driver's seat 48, a throttle valve in an intake air path is interlocked with the accelerator pedal 50, and a throttle opening sensor 52 detects a throttle opening $\theta$. A shift position sensor 54 detects a shift range of a shift lever located close to the driver's seat.

Figure 3:
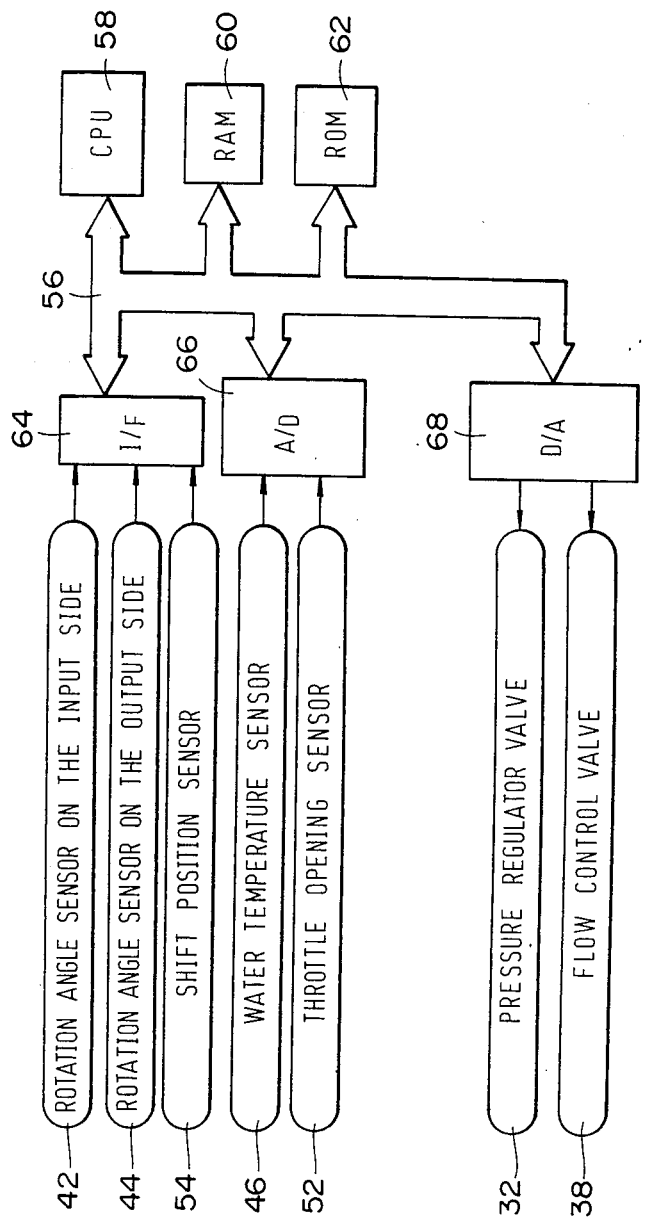
FIG. 3 is a block diagram of the electronic control device.

FIG. 3 is a block diagram of the electronic control device. An address data bus 56 connects a CPU (Central Processing Unit) 58, an RAM (Random Access Memory) 60, an ROM (Read-Only Memory) 62, an I/F (Interface) 64, an A/D (Analogue/Digital Convertor) 66 and D/A (Digital/Analogue Convertor) 68 to one another. The I/F 64 receives pulse signals from the rotation angle sensor 42 on the input side, the rotation angle sensor 44 on the output side and the shift position sensor 54, the A/D 66 receives analogue signals from the water temperature sensor 46 and the throttle opening sensor 52, and the D/A 68 outputs pulse signals to the pressure regulator valve 32 and the flow control valve 38.

Figure 4:
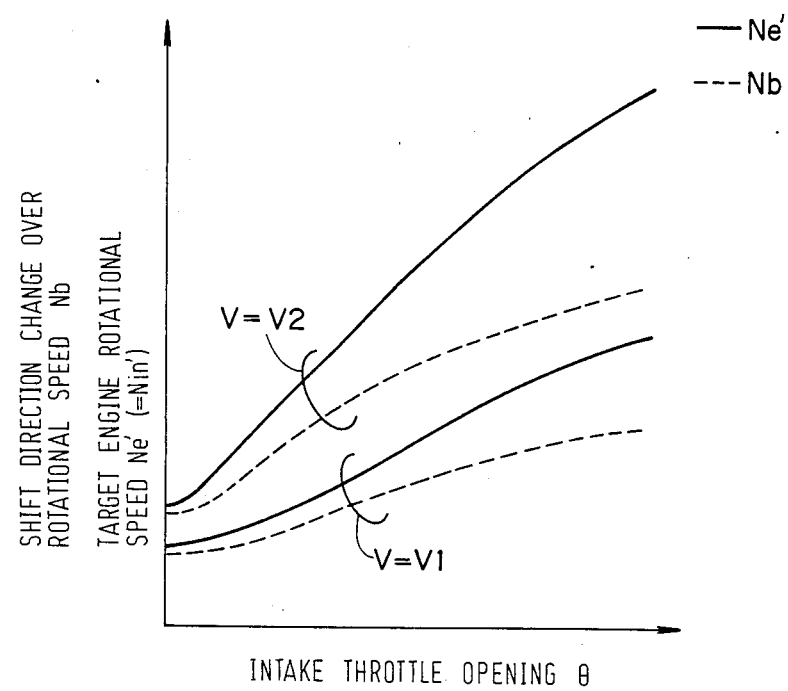
FIG. 4 is a graphic chart showing the target engine rotational speed and the shift direction change-over rotational speed.

FIG. 4 is a graphic chart showing the target engine rotational speed Ne' and the shift direction change-over rotational speed Nb. In this embodiment, the target engine rotational speed Ne' is set as a function of the intake throttle opening $\theta$ and the vehicle speed V (Provided V1≦V2) so that, throughout all of operating conditions of the vehicle, appropriate engine outputs can be obtained and the fuel consumption rate can be minimized. The shift direction change-over rotational speed Nb is set such, for example, as to be at a value of 90% of Ne' in the region of a low throttle opening and at the maximum torque generating rotational speed around the maximum throttle opening. Additionally, in this embodiment, Ne is equal to the actual rotational speed on the input side Nin of the CVT 10 and Ne' is equal to the target engine rotational speed on the input side Nin'.

Figure 1:
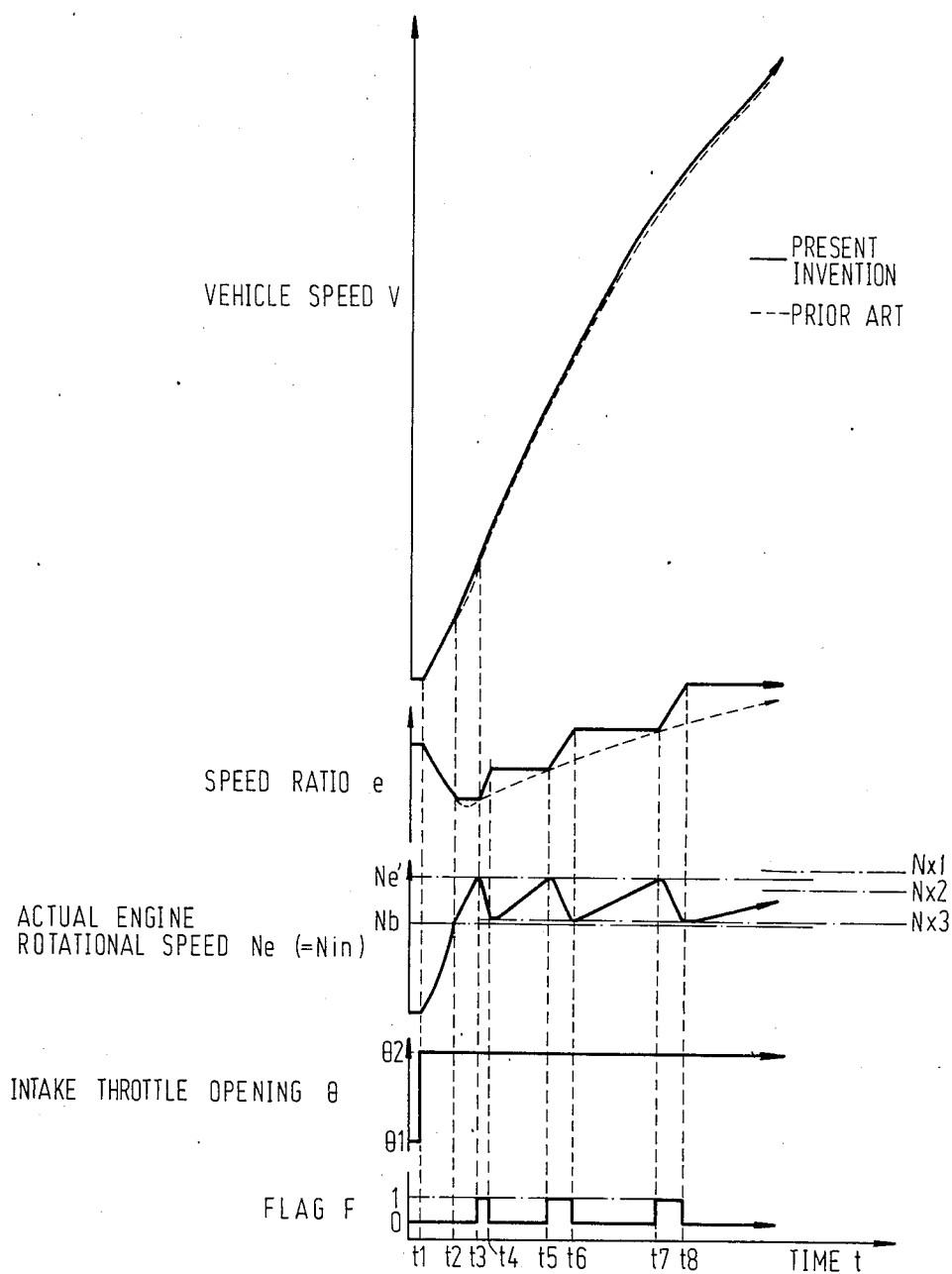
FIG. 1 is a view drawn in explanation of the control according to the present invention, showing changes with time of the speed ratio.

FIG. 1 shows the outline of the control of the CVT 10. Additionally, N×1 is set at a value slightly, e.g. 100 rpm higher than Ne' (=Nin'), N×2 is set at a value slightly, e.g. 50–200 rpm lower than the target engine rotational speed Ne', and N×3 is set at a value slightly, e.g. 50–100 rpm higher than the shift direction change-over rotational speed Nb. Said N×2 is a threshold value for determining whether the difference between Nin' (=Ne') and Nb is large or not. A flag F is set when Ne is changed from a state of Ne≦Ne' to a state of Ne>Ne' and reset when Ne is in a state of Ne≦N×3.

At a time t1, the intake throttle opening $\theta$ is changed from $\theta 1$ to $\theta 2$, whereby the target engine rotational speed Ne' is set at a value in association with $\theta 2$. Since Ne<Nb, the speed ratio e is lowered and Ne is rapidly increased.

At a time t2, when Ne reaches a state of Ne>Nb the speed ratio e is fixed at its value immediately before the time t2, namely, the shift in the CVT 10 is interrupted. Even after the interruption of the shift, the engine rotational speed Ne is increased due to a high engine output, however, the vehicle speed V is smoothly raised in accordance with the increase of Ne.

After time t3, Ne reaches a state of Ne>Ne', whereby the flag F is set. When Ne≧Ne', the speed ratio e is raised due to the feedback control of Ne, and, after reaching the time t3, Ne rapidly reaches a state of Ne<Ne'.

After time t3, the speed ratio e is rapidly raised, and Ne reaches a state of Ne≧N×3 at a time t4, whereby the flag F is reset. Thus, after reaching the time t4, the periods of time during which the shift in the CVT 10 is interrupted, and the periods of time during which the speed ratio e is raised, are alternately repeated and the vehicle speed V is rapidly increased.

In the practical control, during a state of Nb<Ne≧Ne', when F=0, the shift in the CVT 10 is interrupted, while, when F=1, the speed ratio e of the CVT 10 is rapidly raised.

During acceleration, the periods of time, during which the shift in the CVT 10 is performed, can be shortened, and the decline of the fuel consumption rate due to the lowered transmission efficiency of the CVT 10 can be prevented. Furthermore, the engine rotational speed Ne is obtained at a suitably low rotational speed even around the maximum throttle opening, so that the noise level can be lowered. Additionally, when N×2<Nb, namely, when Nb is extremely close to Nin' the rapid raise of the speed ratio e performed under the state where F=1 and N×3<Nin≧Nin' is interrupted, because when N×2<Nb, the repeat between fixing and rapid raising of the speed ratio e make the acceleration unstable.

Figure 5:
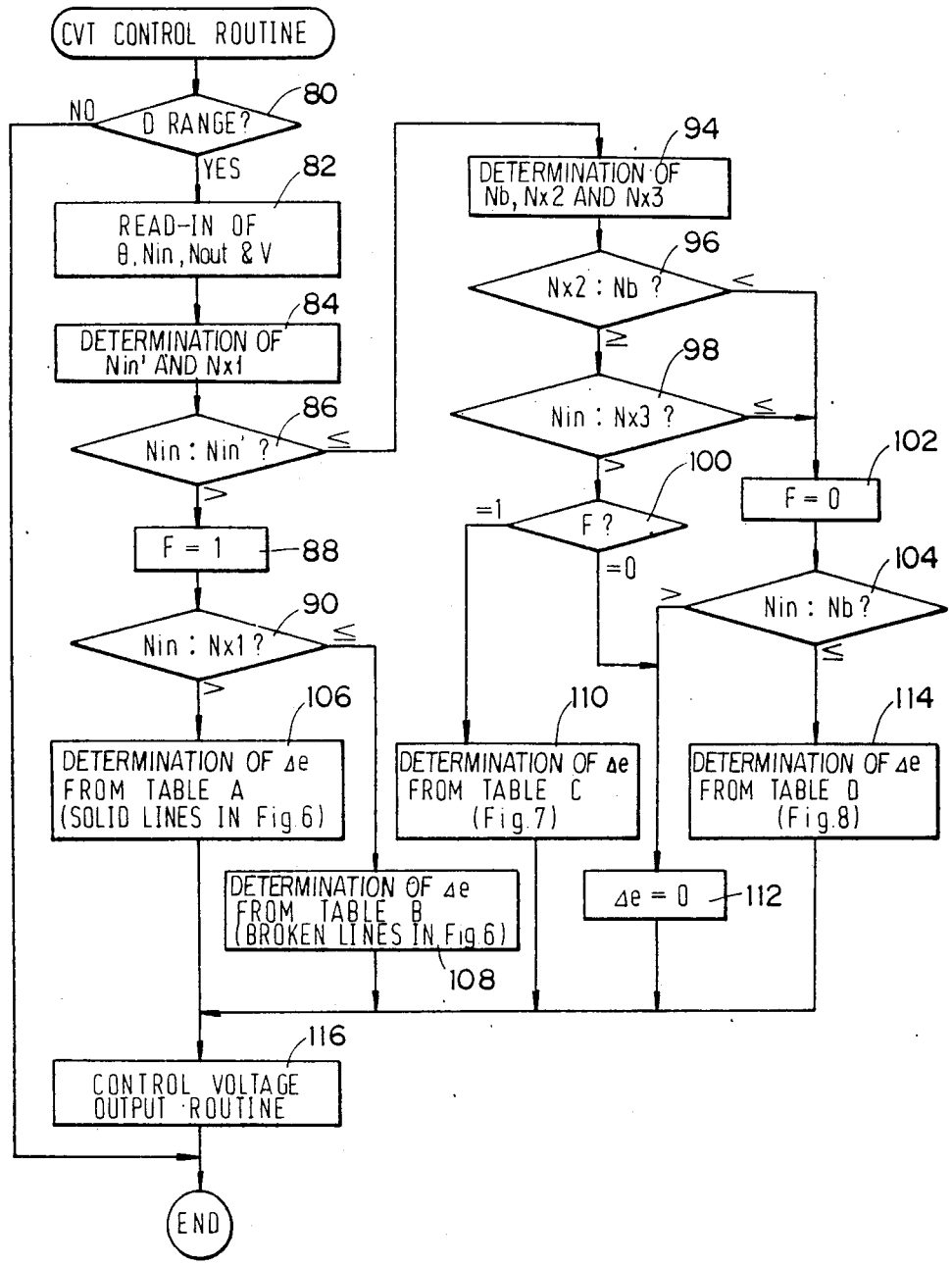
FIG. 5 is a flow chart of the shift control routine of the CVT in accordance with the control shown in FIG. 1.
Figure 6:
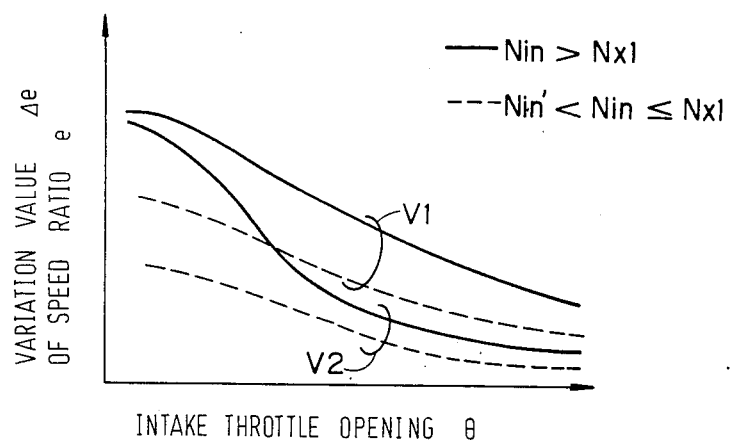
FIG. 6 is a graphic chart of Tables A and B selected in FIG. 5.

FIG. 5 is a flow chart showing a CVT control routine in accordance with the control described in FIG. 1, and FIGS. 6 to 8 are graphic charts showing a variation value $\Delta e$ of the speed ratio e everytime, i.e. the shift speed. $\Delta e$ is set as a function of the intake throttle opening $\theta$ and the vehicle speed V, and V1>V2 in relation to the vehicle speed V. In FIG. 6, the solid lines define $\Delta e$ when Nin>N×1 and $\Delta e$ is set at a high value so that Ne can be rapidly decreased to Ne' where the fuel consumption rate is good.

Figure 7:
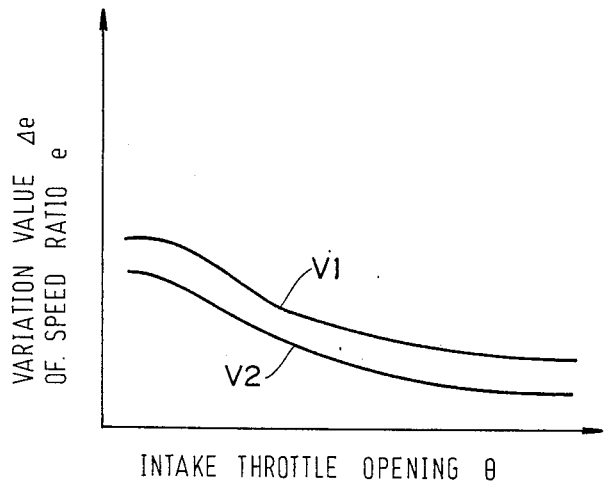
FIG. 7 is a graphic chart of Table C selected in FIG. 5.
Figure 8:
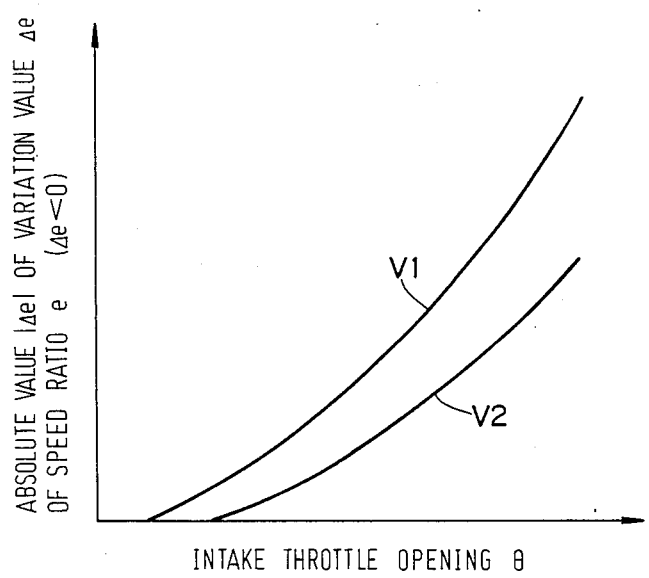
FIG. 8 is a graphic chart of Table D selected in FIG. 5.

In FIG. 6, broken lines define $\Delta e$ when $Nin' < Nin \leq N \times 1$, and $\Delta e$ is set at a low value so that Ne can avoid vibrating to be stabilized to Ne. In FIG. 7, $\Delta e$ is selected when $F=1$ and $N \times 3 < Ne \leq Ne'$, and $\Delta e$ is set so that the speed ratio e can be rapidly raised with the shift quality being controlled within a tolerance. In FIG. 8, $\Delta e$ is selected when $Ne \leq Nb$ and set so that Ne can rapidly reach Ne'. Additionally, $\Delta e < 0$ only in the case of FIG. 8.

Detailed description will now be given of the flow chart shown in FIG. 5. Judgment is made as to whether the range is D (Drive) or not (Step 80), and, only when the range is D, this shift control routine is processed. The intake throttle opening $\theta$, the rotational speed on the input side Nin (=Ne) of the CVT 10, the rotational speed on the output side Nout and the vehicle speed V are read in (Step 82), and the target rotational speed on the input side Nin' (=Ne') is determined from $\theta$ and V in accordance with the graphic relationship stored in ROM 62, and shown in FIG. 4. And $N \times 1$ is determined from Nin' (Step 84). Subsequently, Nin and Nin' are compared with each other, and, when Nin>Nin', the flag F is set (Step 88), and further, Nin and $N \times 1$ are compared with each other (Step 90). In comparison between Nin and Nin' (Step 86), when $Nin \leq Nin'$, the shift direction change-over rotational speed Nb is determined in accordance with the relationship shown in dashes in FIG. 4, which relationship is also stored in ROM 62 (Step 94), $N \times 2$ and $N \times 3$ is determined, and $N \times 2$ and Nb are compared with each other (Step 96). The reason why $N \times 2$ and Nb are compared with each other is that this control is interrupted when Nb is satisfactorily close to Nin', namely, when $N \times 2 < Nb$, a desirable effect cannot be obtained even if such a control that the fixing and raising of e as shown in FIG. 1 is performed. Subsequently, Nin and $N \times 3$ are compared with each other (Step 98), when $Nin > N \times 3$, the flag F is set (Step 100), and, when $Nin \leq N \times 3$, the flag F is reset (Step 102), and Nin and Nb are compared with each other (Step 104).

Finally, when $Nin > N \times 1$, $\Delta e$ is calculated on the basis of Table A following the solid lines in FIG. 6 (Step 106), when $Nin' < Nin \leq N \times 1$, $\Delta e$ is calculated on the basis of Table B following the broken lines in FIG. 6 (Step 108), when $N \times 3 < Nin \leq Nin'$ and $F=1$, $\Delta e$ is calculated on the basis of Table C following FIG. 7 (Step 110), even when $N \times 3 < Nin < Nin'$, if $F=0$, and $Nb < Nin \leq N \times 3$, then $\Delta e = 0$ (Step 112), and, when $Nin \leq Nb$, $\Delta e$ is calculated on the basis of Table D following FIG. 8. Tables A, B, C and D are each stored in ROM 62.

In a control voltage output routine (Step 116), an output voltage of the flow control valve 38 is calculated on the basis of $\Delta e$, and outputted. When $\Delta e > 0$, the higher $\Delta e$ is in value, the feed flowrate of oil to the hydraulic cylinder on the input side of the CVT 10 is increased, whereas, when $\Delta e < 0$, the higher $\Delta e$ is in absolute value, the discharge flowrate of oil from the hydraulic cylinder on the input side of the CVT 10 is increased.

The present invention has been described with reference to the embodiment, and it should be apparent that those skilled in the art can work the present invention in various modifications without departing from the spirit described in claims.

What is claimed is:

1. A device for performing the control during acceleration in a continuously variable transmission system for a vehicle, wherein a speed ratio e of said continuously variable transmission system is controlled such that an actual engine rotational speed Ne can be a target engine rotational speed Ne', comprising:
   processor means for performing the functions of,
   setting a predetermined value Nb lower than said Ne' and a predetermined value $N \times 3$ slightly higher than Nb,
   generating a signal for controlling interrupting, when Ne enters a state of $Nb < Ne \leq N \times 3$, changes in the speed ratio of said continuously variable transmission system until Ne is increased to a predetermined value equal to or higher than Ne', and
   generating for controlling continuously raising the speed ratio e of said continuously variable transmission system until Ne is decreased to a state of $Ne \leq N \times 3$ when Ne is changed from a state of $Ne \geq Ne'$ to a state of $Ne < Ne'$; and
   means for varying said speed ratio e under the control of the signals generated by said processor means.

2. A device for performing the control during acceleration in a continuously variable transmission system for a vehicle as set forth in claim 1, wherein said target engine rotational speed Ne' is set as a function of an intake throttle opening and a vehicle speed.

3. A device for performing the control during acceleration in a continuously variable transmission system for a vehicle as set forth in claim 1, wherein said Nb is set at a value in a predetermined ratio to Ne' in a region of a low throttle opening.

4. A device for performing the control during acceleration in a continuously variable transmission system for a vehicle as set forth in claim 3, wherein said Nb is set at a value of 90% of Ne' in a region of a low throttle opening.

5. A device for performing the control during acceleration in a continuously variable transmission system for a vehicle as set forth in claim 1, wherein said Nb is set as the maximum torque engine rotational speed during the maximum throttle opening.

6. A device for performing the control during acceleration in a continuously variable transmission system for a vehicle as set forth in claim 1, wherein said $N \times 3$ is set at a value 50–200 rpm higher than Nb.

7. A device for performing the control during acceleration in a continuously variable transmission system for a vehicle as set forth in claim 1, wherein, in the case where said Ne is changed from state of $Ne > Ne'$ to a state of $Ne < Ne'$, the variation value of said speed ratio e of said continuously variable transmission system before Ne is decreased to a state of $Ne \leq N \times 3$ is set separately of the case other than the above.

8. A device for performing the control during acceleration in a continuously variable transmission system for a vehicle, wherein a speed ratio e of said continuously variable transmission system is controlled such that an actual engine rotational speed Ne can be a target engine rotational speed Ne', comprising:
   processor means for performing the functions of,
   setting a predetermined value Nb lower than said Ne' and a predetermined value $N \times 3$ slightly higher than Nb,
   detecting whether a difference between Ne' and Nb is large or not,
   generating a signal for controlling interrupting, when Ne enters a state of $Nb < Ne \leq N \times 3$, changes in the speed ratio of said continuously variable transmission system until Ne is increased to a predetermined value equal to or higher than Ne', and generating signals for controlling continuously raising the speed ratio e of said continuously variable transmission system until Ne is decreased to a state of Ne≦N×3 when the difference between Ne' and Nb is large and Ne is changed from a state Ne≦Ne' to a state of Ne<Ne'; and means for varying said speed ratio e under control of the signals generated by said processor means.

9. A device for performing the control during acceleration in a continuously variable transmission system for a vehicle as set forth in claim 8, wherein a threshold value N×2 for determining whether the difference between Ne' and Nb is large or not is set at a value 50–200 rpm lower than Ne'.

10. A device for performing the control during acceleration in a continuously variable transmission system for a vehicle, wherein a speed ratio e of said continuously variable transmission system is controlled such that an actual engine rotational speed Ne can be a target engine rotational speed Ne', comprising:

processor means for performing the functions of, setting a predetermined value N×1 higher than said Ne', generating signals for controlling the variation value Δe of said speed ratio e to be at a small value when said Ne is in a state of Ne'<Ne<N×1, and generating signals for controlling the variation value Δe of said speed ratio e to be at a large value when said Ne is in a state of Ne>N×1; and means for varying said speed ratio e under control of the signals generated by said processor means.

11. A device for performing the control during acceleration in a continuously variable transmission system for a vehicle as set forth in claim 10, wherein N×1 is set at a value 100 rpm higher than Ne'.

* * * * *

UNITED STATES PATENT AND TRADEMARK OFFICE
CERTIFICATE OF CORRECTION

PATENT NO. : 4,704,683

DATED : 11-03-87

INVENTOR(S) : Akinori Osanai

It is certified that error appears in the above-identified patent and that said Letters Patent is hereby corrected as shown below:

--Title information is incorrectly recorded.
  It should read:
    DEVICE FOR PERFORMING CONTROL DURING ACCELERATION IN
    CONTINUOUSLY VARIABLE TRANSMISSION SYSTEM FOR VEHICLE--

Signed and Sealed this

Nineteenth Day of April, 1988

Attest:

DONALD J. QUIGG

*Attesting Officer*  *Commissioner of Patents and Trademarks*